United States Patent
Lu et al.

(10) Patent No.: US 11,211,817 B1
(45) Date of Patent: Dec. 28, 2021

(54) UNINTERRUPTIBLE POWER SUPPLY CAPABLE OF INTELLIGENTLY CONTROLLING DIRECT CURRENT OUTPUT

(71) Applicant: VOLTRONIC POWER TECHNOLOGY CORP., Taipei (TW)

(72) Inventors: Yu-Cheng Lu, Taipei (TW); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 0 days.

(21) Appl. No.: 17/191,958

(22) Filed: Mar. 4, 2021

(30) Foreign Application Priority Data

Nov. 9, 2020 (TW) .................................. 109138959

(51) Int. Cl.
*H02J 9/06* (2006.01)
*H02J 3/38* (2006.01)
*H02J 7/35* (2006.01)

(52) U.S. Cl.
CPC .............. *H02J 9/06* (2013.01); *H02J 3/381* (2013.01); *H02J 7/35* (2013.01); *H02J 2207/20* (2020.01); *H02J 2300/26* (2020.01)

(58) Field of Classification Search
CPC ........ H02J 9/06; H02J 9/31381; H02J 9/3138; H02J 9/7135; H02J 2207/20; H02J 2300/26

See application file for complete search history.

(56) References Cited

U.S. PATENT DOCUMENTS

2014/0183958 A1* 7/2014 Yeh ......................... H02J 9/062
307/66

FOREIGN PATENT DOCUMENTS

| CN | 108509012 A | 9/2018 |
|---|---|---|
| CN | 110768368 A | 2/2020 |
| TW | 201505325 A | 2/2015 |
| TW | 201546605 A | 12/2015 |
| TW | 201838282 A | 10/2018 |
| TW | 202030968 A | 8/2020 |
| WO | 2016123879 A1 | 8/2016 |

* cited by examiner

*Primary Examiner* — Robert L Deberadinis
(74) *Attorney, Agent, or Firm* — Li & Cai Intellectual Property (USA) Office (57) ABSTRACT

An uninterruptible power supply capable of intelligently controlling direct current (DC) output is provided. The uninterruptible power supply includes a power conversion integrated circuit, a first switch, a first controller, a DC to DC (DC-DC) converter, and a second controller and a battery pack. The first controller generates a first control signal and a second control signal, the second control signal is connected to the power conversion integrated circuit, and the first control signal is connected to the second controller configured inside the DC-DC converter. The battery pack is connected to the DC-DC converter to form a first power path, the DC-DC converter is connected to the power conversion integrated circuit to form a second power path, and the battery pack is connected to the power conversion integrated circuit to form a third power path.

8 Claims, 9 Drawing Sheets

UNINTERRUPTIBLE POWER SUPPLY CAPABLE OF INTELLIGENTLY CONTROLLING DIRECT CURRENT OUTPUT

CROSS-REFERENCE TO RELATED PATENT APPLICATION

This application claims the benefit of priority to Taiwan Patent Application No. 109138959, filed on Nov. 9, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an uninterruptible power supply capable of intelligently controlling direct current output, and more particularly to an uninterruptible power supply capable of intelligently controlling direct current output that includes multiple direct current output socket interfaces, and is capable of directly providing direct current power sources that are required by direct current appliances.

BACKGROUND OF THE DISCLOSURE

In the conventional technology, most uninterruptible power supplies only provide for alternating current (AC) power outputs, so as to meet the use requirements of utility-supplied AC power. For commonly used appliances, such as webcams utilized in closed-circuit television cameras (CCTV), wireless network routers, Wi-Fi routers, digital telephones, or surveillance cameras that use direct current (DC) power, in order to use a common uninterruptible power supply, an adapter is required to be connected at an input terminal to convert a DC into an AC, and the input terminal is then plugged into the uninterruptible power supply. Furthermore, an uninterruptible power supply capable of providing multiple DC power outputs is currently not commercially available, and of the uninterruptible power supplies that are commercially available, none have multiple DC power outlets.

SUMMARY OF THE DISCLOSURE

In response to the above-referenced technical inadequacies, the present disclosure provides an uninterruptible power supply capable of intelligently controlling direct current (DC) output that has an output terminal for general alternating current (AC) power, and has a DC output power supply required by a DC load. Practically, the DC output power supply can include DC output power of various voltages, such as 3V, 5V, 12V, 15V, or 24V, so as to be used by various DC appliance electrical loads. For example, the DC power required by lenses of network surveillance cameras can be provided in the present disclosure, and the DC power supply required by wireless network routers, Wi-Fi routers, wireless network servers and digital telephones, etc., can also be provided in the present disclosure. In the uninterruptible power supply of the present disclosure, different power supplies are provided according to different power sources, such that switching between power paths of different power supply states can be effectively controlled, and the DC power required by the DC appliance electrical loads can be stably and uninterruptedly provided. Therefore, for the DC appliance electrical loads requiring a continuous DC power supply, the risks of losing video data, sudden network disconnection, or interruption of the operation of a digital phone that are caused by an interruption of power supply can be prevented, thereby effectively increasing the security of digital data processing.

In one aspect, the uninterruptible power supply capable of intelligently controlling DC output provided in the present disclosure is configured to have a utility power input terminal, an AC power output terminal, and a DC power output terminal group, and the uninterruptible power supply capable of intelligently controlling DC output includes a power conversion integrated circuit, a first switch, a first controller, a DC to DC (DC-DC) converter, a second controller, and a battery pack. An input terminal of the power conversion integrated circuit is connected to the utility power input terminal, and the power conversion integrated circuit has an AC output terminal. A first terminal group of the first switch is connected to the utility power input terminal, a second terminal group of the first switch is connected to the AC output terminal of the power conversion integrated circuit, and a third terminal group of the first switch is connected to the AC power output terminal. The first controller generates a second control signal, and the second control signal is connected to the power conversion integrated circuit. The DC-DC converter has a second power path, the second power path is a path formed by an input terminal of the DC-DC converter connecting to the power conversion integrated circuit, and an output terminal of the DC-DC converter is connected to the DC power output terminal group. The second controller is configured inside the DC-DC converter, a terminal of the second controller is connected to a first control signal of the first controller, and another terminal of the second controller is connected to a second switch. The battery pack and the DC-DC converter are connected to form a first power path, and the battery pack and the power conversion integrated circuit are connected to form a third power path.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

An uninterruptible power supply capable of intelligently controlling direct current (DC) output is provided by the present disclosure. In the uninterruptible power supply of the present disclosure, different power supplies are provided according to different power sources, such that switching between power paths of different power supply states can be effectively controlled, and the DC power required by the DC appliance electrical loads can be stably provided. Therefore, for the DC appliance electrical loads requiring a continuous DC power supply, the risks of losing video data, sudden network disconnection, or interruption of the operation of a digital phone that are caused by an interruption of power supply can be prevented.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
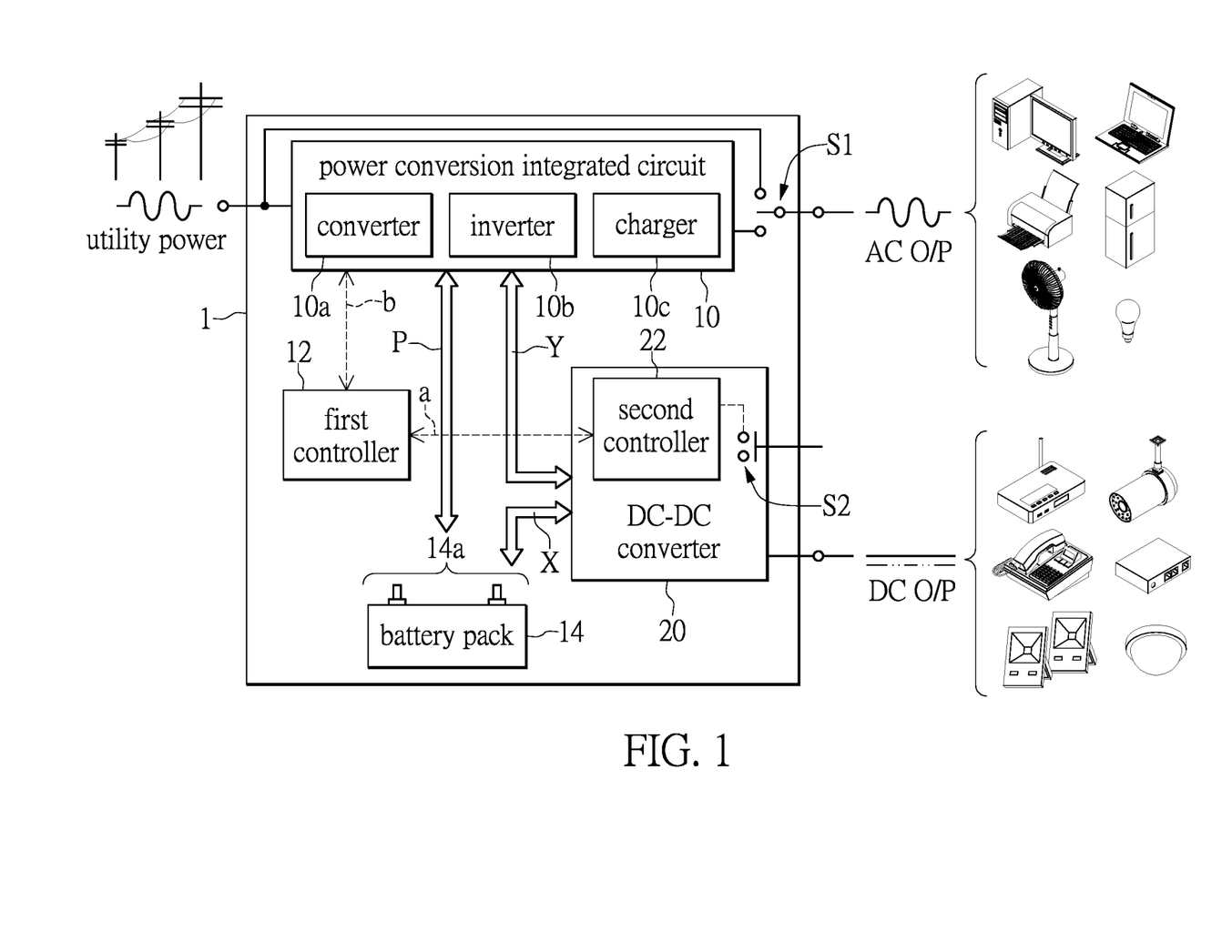
FIG. 1 is a block diagram of a circuit connection according to one embodiment of the present disclosure.

Referring to FIG. 1, an uninterruptible power supply capable of intelligently controlling DC output 1 provided in the present disclosure is configured to have a utility power input terminal, an alternating current (AC) power output terminal (AC O/P), and a DC power output terminal group (DC O/P). The uninterruptible power supply capable of intelligently controlling DC output 1 includes a power conversion integrated circuit 10, a first switch S1, a first controller 12, a DC to DC (DC-DC) converter 20, a second controller 22, and a battery pack 14. In practice, the utility power input terminal is an AC utility power source. An input terminal of the power conversion integrated circuit 10 is connected to the utility power input terminal, and the power conversion integrated circuit 10 has an AC output terminal connected to the first switch S1. At the same time, the utility power source is directly connected to the first switch S1. Practically, the power conversion integrated circuit 10 includes a converter 10a, an inverter 10b, and a charger 10c. The converter 10a is used to convert an AC power into a DC power, the inverter 10b inverts the DC power into the AC power, and the charger 10c performs charging for the battery pack 14. As shown in FIG. 1, in the present disclosure, the converter 10a, the inverter 10b and the charger 10c respectively having three circuit switching functions are integrated into the power conversion integrated circuit 10.

Practically, the DC power output terminal group includes a plurality of DC output types, which include, but are not limited to, having a plurality of DC voltage outputs, or a DC power output interface including various types of plugs and sockets. That is, the DC power output terminal group is not a single DC power output, but includes a plurality of DC power outputs.

As shown in FIG. 1, a first terminal group of the first switch S1 (e.g., a terminal point at an upper left side of the first switch S1 of FIG. 1) is connected to the utility power input terminal, a second terminal group of the first switch S1 (e.g., a terminal point at a lower left side of the first switch S1 of FIG. 1) is connected to the AC output terminal of the power conversion integrated circuit 10. Further, a third terminal group of the first switch S1 (e.g., a terminal point at a right side of the first switch S1 of FIG. 1) is connected to the aforementioned AC power output terminal. In the present disclosure, the first controller 12 generates a first control signal a and a second control signal b, the first control signal a is connected to the second controller 22 of the DC-DC converter 20, and the second control signal b is connected to the power conversion integrated circuit 10. The first control signal a and the second control signal b are configured to control, when the uninterruptible power supply capable of intelligently controlling DC output 1 is provided with different input power or power supply, different power paths generated corresponding to the AC power output terminal and the DC power output terminal of the uninterruptible power supply 1, so as to achieve the purpose of providing stable AC power and DC power.

As shown in FIG. 1, an input terminal of the DC-DC converter 20 is connected to a first power path X and a second power path Y. The battery pack 14 and the input terminal of the DC-DC converter 20 are connected to form the first power path X, the input terminal of the DC-DC converter 20 and the power conversion integrated circuit 10 are connected to form the second power path Y, and an output terminal of the DC-DC converter 20 is connected to the DC power output terminal group. In one embodiment, an output terminal of the DC-DC converter 20 may be the DC power output terminal of the uninterruptible power supply 1 of the present disclosure. The battery pack 14 and the DC-DC converter 20 are connected to form the first power path X. At the same time, the battery pack 14 and the power conversion integrated circuit 10 are connected to form the third power path P, in which a battery connection terminal 14a is included as an input/output interface of the battery pack 14 for external connection.

The second controller 22 is configured inside the DC-DC converter 20, a terminal of the second controller 22 is connected to the first control signal a of the first controller 12, and another terminal of the second controller 22 is connected to a second switch S2. The second switch S2 functions as a switch that directly controls the switching on or off of the DC power output terminal. In practical use, the second switch S2 may be a physical key or button switch, or a single pole switch that allows a user to choose to switch on a DC supply of the DC power output terminal, or to switch off the DC supply of the DC power output terminal. On the other hand, the second switch S2 may be directly controlled to be switched on or off by the second controller 22. Furthermore, the second switch S2 may be indirectly controlled to be switched on or off by the first controller 12 through the second controller 22. The first switch S1 is used to provide a stable AC output power to the AC power output terminal, perform and control switching to an uninterruptible source that effectively provides power, so that a power outage can be prevented from occurring to the AC power output terminal.

Practically, the first controller 12 of the present disclosure may be a single-chip micro control unit or a microcontroller, or the control function of the first controller 12 can be integrated to a central processing unit (CPU) (that is not shown in the figures) of the uninterruptible power supply 1. Further, the first controller 12 of the present disclosure may be a chip of a microcontroller of the uninterruptible power supply 1. That is, the present disclosure is not limited to a specific production form of the first controller 12, and the first controller 12 may further control the power conversion integrated circuit 10, the battery pack 14, and the DC-DC converter 20 to perform switching operation of transmission by a variety of power paths, whether or not the utility power provides power. Similarly, the second controller 22 may be a single micro control unit or a microcontroller, or may be integrated to a switching circuit controller (that is not shown in the figures) of the DC-DC converter 20.

Figure 2:
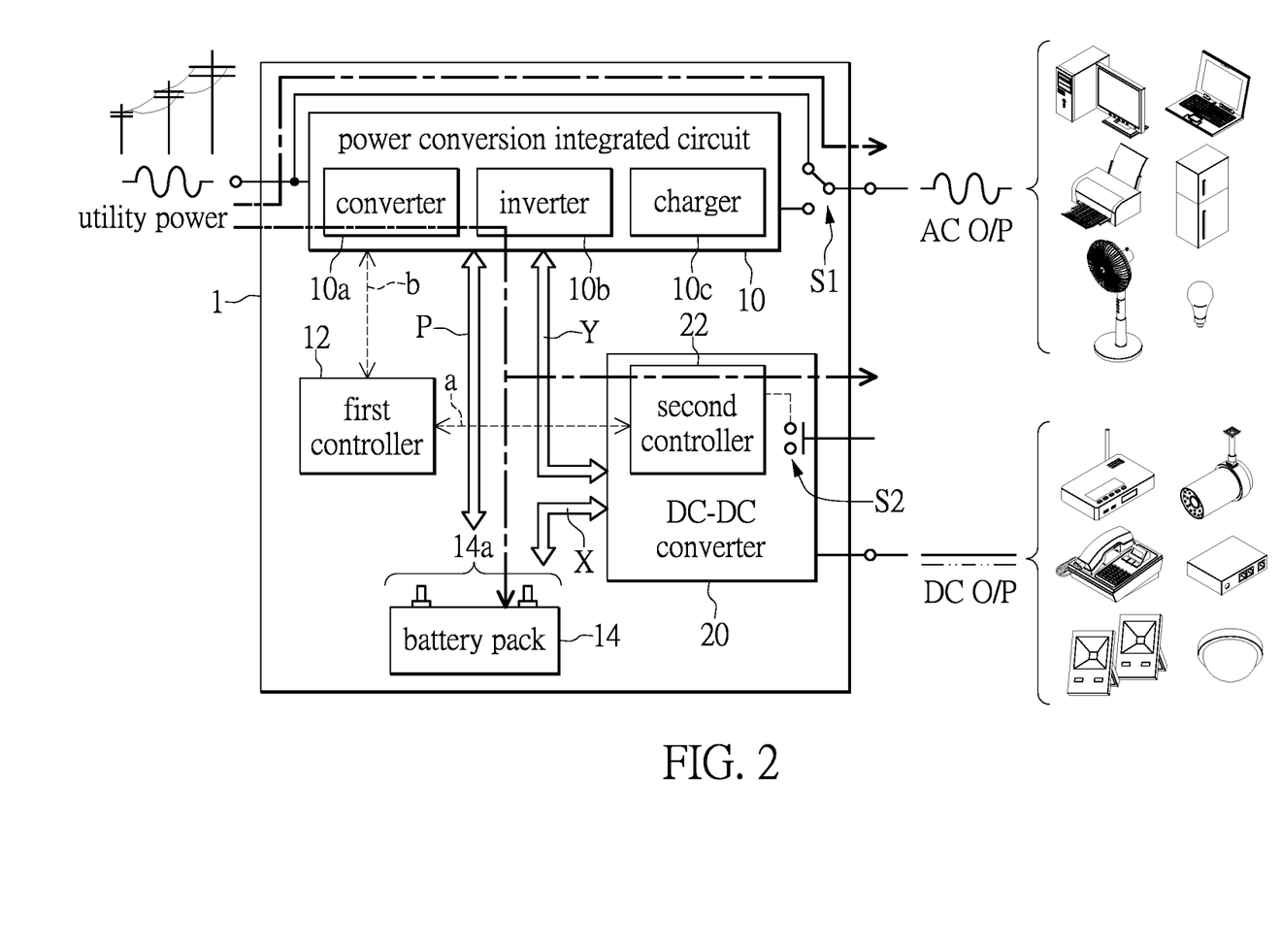
FIG. 2 is a schematic diagram of a power path of a utility power providing power according to one embodiment of the present disclosure.

Referring to FIG. 2, a direction of a power path of a power source when the utility power provides power normally is further described. When the utility power provides power normally, the AC output power of the uninterruptible power supply 1 is directly provided by the utility power; that is, the first switch S1 is switched to the first terminal group, so that the AC power required by the AC power output terminal of the uninterruptible power supply 1 is provided. At the same time, the first controller 12, through the second control signal b, controls the converter 10a of the power conversion integrated circuit 10 to convert a utility AC power to a DC power that is transmitted to the DC-DC converter 20 through the second power path Y. Then, the first controller 12 controls the second controller 22 through the first control signal a, so that a DC output terminal of the DC-DC converter 20 outputs DC power output types as required by the user, such as outputting DC output power having voltages like 3V, 5V, 12V, 15V or 24V, thereby satisfying requirements of the user. Meanwhile, the second switch S2 is switched on. Therefore, DC power required by terminal DC appliances, such as network routers, digital telephones, digital speakers, digital products, webcams, network surveillance cameras and servers, can be provided. On the other hand, as shown in FIG. 2, apart from controlling the converter 10a of the power conversion integrated circuit 10 through the second control signal b to convert the utility AC power to the DC power, the first controller 12 also controls the charger 10c, so that the charger 10c continuously charges the battery pack 14 through the connection of the third power path P.

Figure 3:
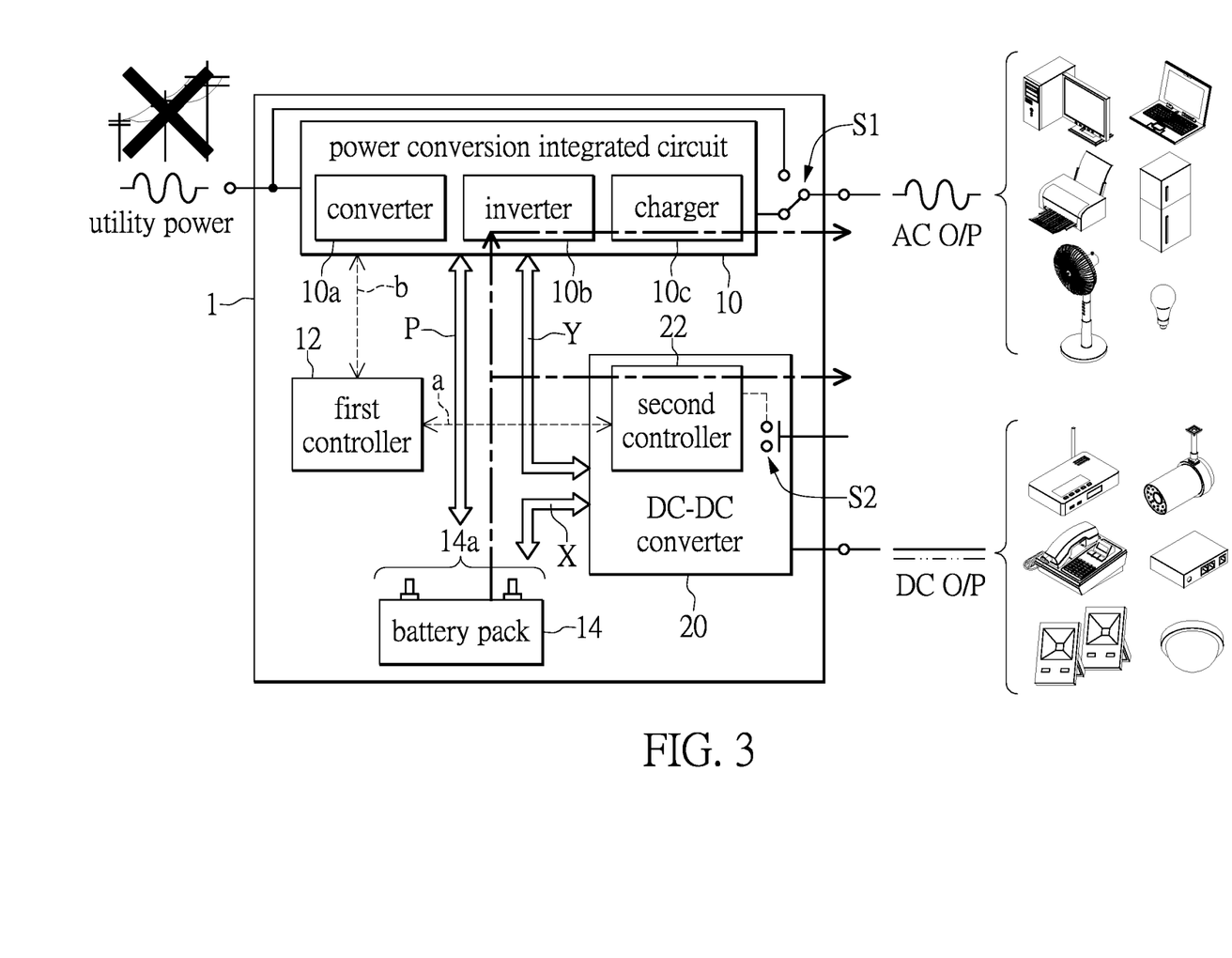
FIG. 3 is a schematic diagram of a power path of a battery pack providing power, without the utility power providing power, according to one embodiment of the present disclosure.

As shown in FIG. 3, when the utility power fails and stops providing the AC power, the battery pack 14 serves as a main power source of the uninterruptible power supply capable of intelligently controlling DC output 1 provided in the present disclosure. The second control signal b of the first controller 12 controls the inverter 10b of the power conversion integrated circuit 10 to invert the DC power provided by the battery pack 14 to the AC power. The DC power of the battery pack 14 is transmitted to the power conversion integrated circuit 10 through the third power path P, and is inverted to the AC power by the inverter 10b before being output to the AC power output terminal. At the same time, the first switch S1, through the control of the first controller 12, switches an output terminal to the aforementioned second terminal group (e.g., the terminal point at the lower left side of the first switch S1 of FIG. 1), so that the AC power is provided. In this way, AC power output can be provided persistently and continuously for the use of home appliances that require the AC power.

At the same time, in FIG. 3, the first control signal a of the first controller 12 controls the second controller 22 of the DC-DC converter 20, so that the DC power of the battery pack 14 is transmitted to the DC-DC converter 20 through the first power path X. The second controller 22 further controls the DC power type that is output by the output terminal of the DC-DC converter 20, e.g., the second controller 22 controls DC voltage value of the DC output power to be 3V, 5V, 12V, 15V, or 24V. At this time, the second switch S2 is controlled to be switched on.

Figure 4:
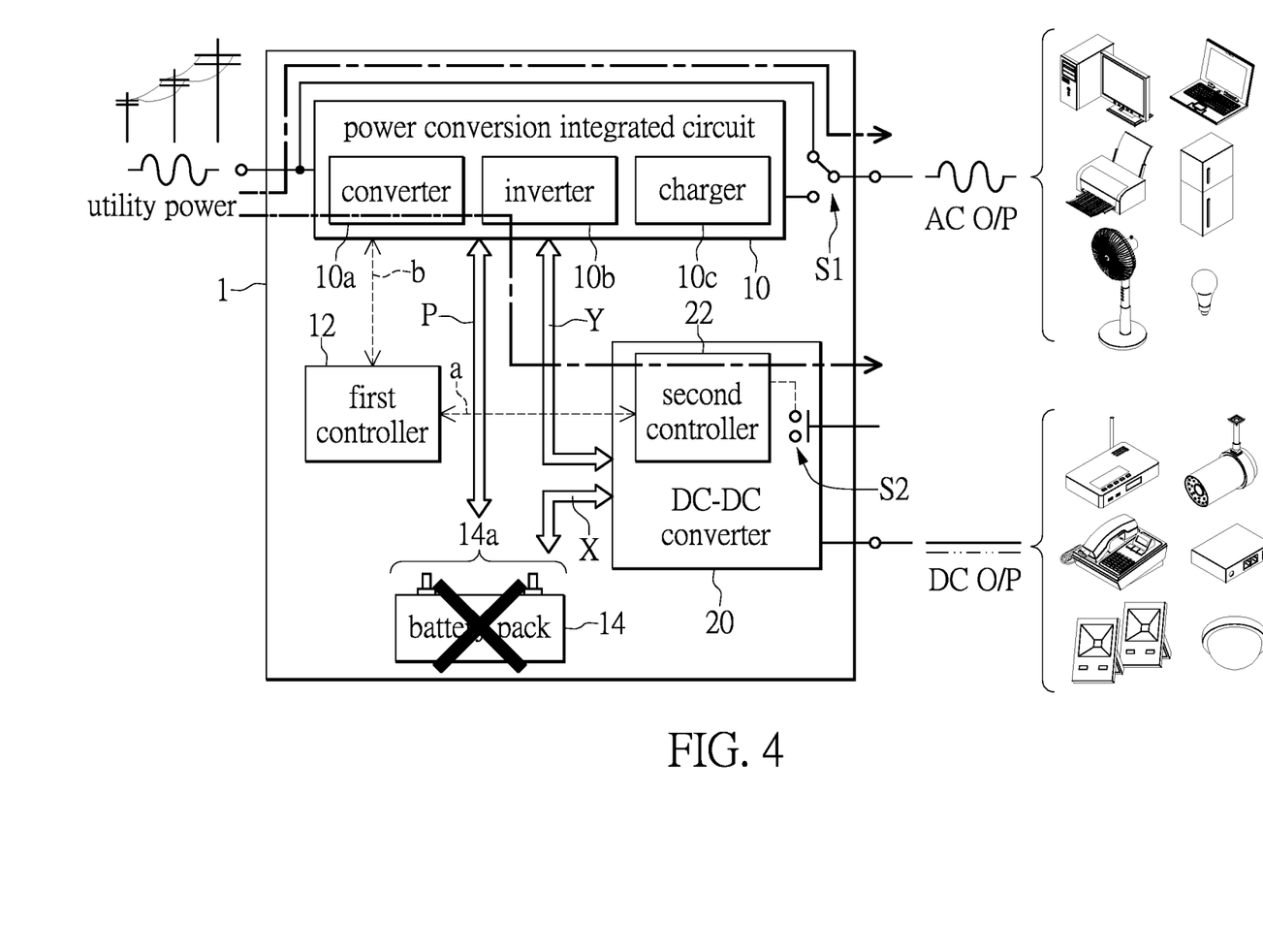
FIG. 4 is a schematic diagram of a power path of the utility power providing power, without the battery pack providing power, according to one embodiment of the present disclosure.

Referring to FIG. 4, when the utility power provides power normally but the battery pack 14 fails to function, the main power source of the uninterruptible power supply capable of intelligently controlling DC output 1 provided in the present disclosure is still the AC power of the utility power. What is different from FIG. 2 is that, although the battery pack 14 fails to function, the second control signal b of the first controller 12 can still transfer the charging energy to the DC-DC converter 20 through the power conversion integrated circuit 10, so that the DC power is output to the DC power output terminal. Furthermore, in a completely battery-free system, the second control signal b of the present disclosure can still transfer the charging energy to the DC-DC converter 20 through the power conversion integrated circuit 10, so that the DC power is output to the DC power output terminal.

Figure 5:
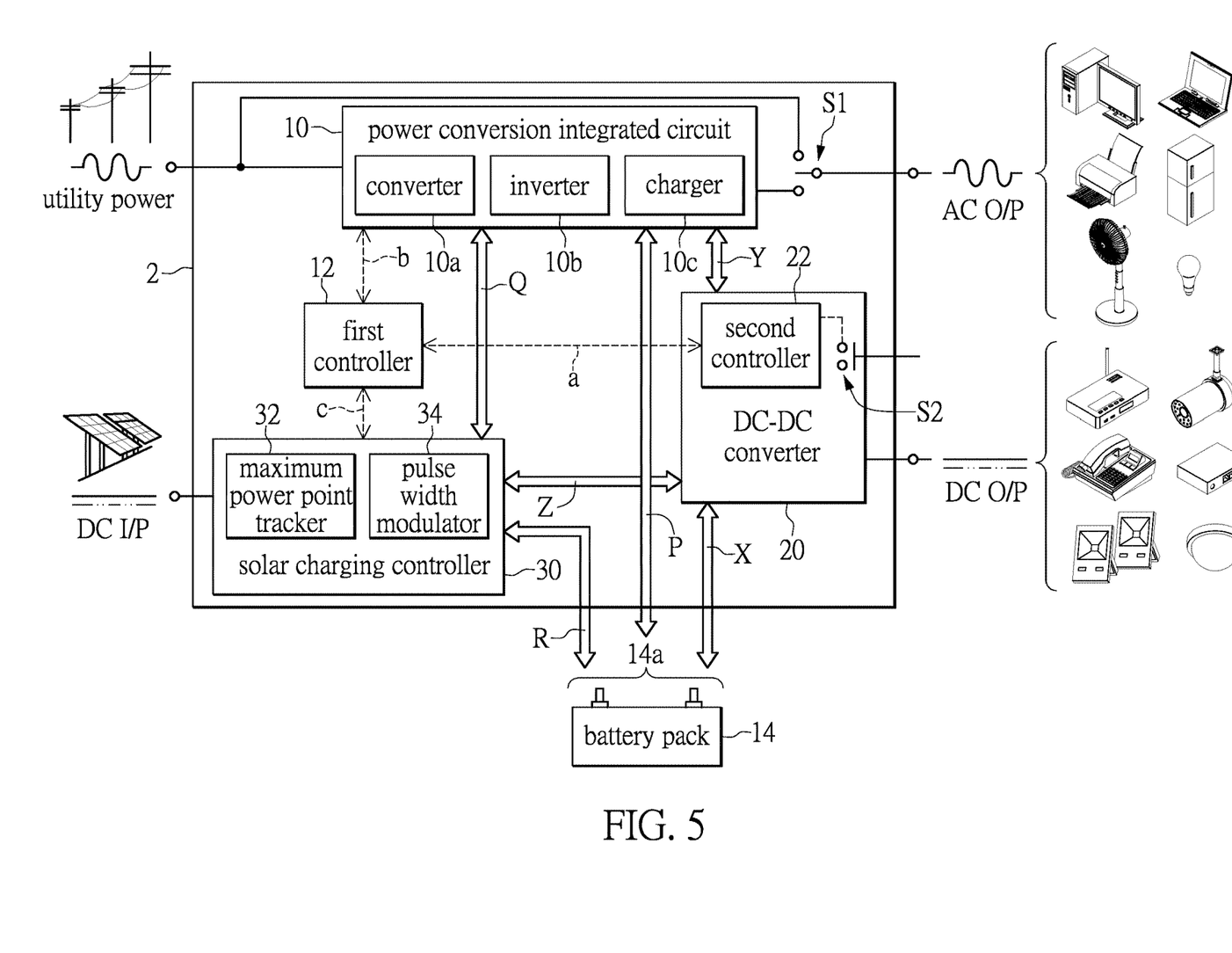
FIG. 5 is a block diagram of a circuit connection according to another embodiment of the present disclosure.

Another embodiment of the present disclosure is shown in FIG. 5, in which the uninterruptible power supply 1 of FIG. 1 is implemented by using solar photovoltaic energy as one of power sources. That is, in practice, the embodiment shown in FIG. 5 can be a solar inverter 2 having an uninterruptible power supply function. At this time, in terms of the naming used in the present disclosure, the uninterruptible power supply 1 can be renamed as the solar inverter 2. The main circuit therein is mostly unchanged, except that in addition to the utility power providing the AC power, a DC power input having a DC type can also be provided through a solar photovoltaic device. Since there are two types of input power, the necessity for the intelligent control capability provided in the present disclosure is even higher, so that different types of input power can be effectively used, and the DC power output and the AC power output that are uninterruptible can be provided. The solar inverter 2 of the embodiment shown in FIG. 5 is also configured to have a utility power input terminal, an AC power output terminal and a DC power output terminal group. The difference is that the solar inverter 2 further has a DC power input terminal, and the DC power input terminal is connected to a DC power generated by a solar photovoltaic board. The battery pack 14 as shown in FIG. 1 is configured to be an external battery pack, and a battery pack connection terminal 14*a* is disposed in the solar inverter 2.

The solar inverter 2 shown in the embodiment of FIG. 5 also includes the power conversion integrated circuit 10, the first switch S1, the first controller 12, the DC-DC converter 20, the second controller 22, the battery pack connection terminal 14*a*, and includes a solar charging controller 30. The battery pack connection terminal 14*a* is externally connected to the battery pack 14. A difference between the solar inverter 2 and the uninterruptible power supply 1 is that, the solar inverter 2 includes the solar charging controller 30. The solar charging controller 30 is simultaneously connected to the first controller 12, the power conversion integrated circuit 10, the DC-DC converter 20, and the battery pack connection terminal 14*a*. Furthermore, the solar charging controller 30 is connected to the first controller 12 through a third control signal c, and the solar charging controller 30 and the power conversion integrated circuit 10 are connected to form a fourth power path Q, the solar charging controller 30 and the DC-DC converter 20 are connected to form a sixth power path Z, and the solar charging controller 30 and the battery pack connection terminal 14*a* are connected to form a fifth power path R. The connections of the power conversion integrated circuit 10, the first switch S1, the first controller 12, the DC-DC converter 20, the second controller 22 and the battery pack connection terminal 14*a* are identical to that of the uninterruptible power supply 1 of FIG. 1, and will not be reiterated herein.

In FIG. 5, the solar charging controller 30 includes a maximum power point tracker (MPPT) 32 and a pulse-width modulation (PWM) controller 34. The maximum power point tracker 32 is configured to perform tracking of a maximum power point in a solar photovoltaic power of the solar charging controller 30. The pulse-width modulation controller 34 is configured to perform pulse-width modulation for a power switching control circuit of the solar charging controller 30.

Figure 6:
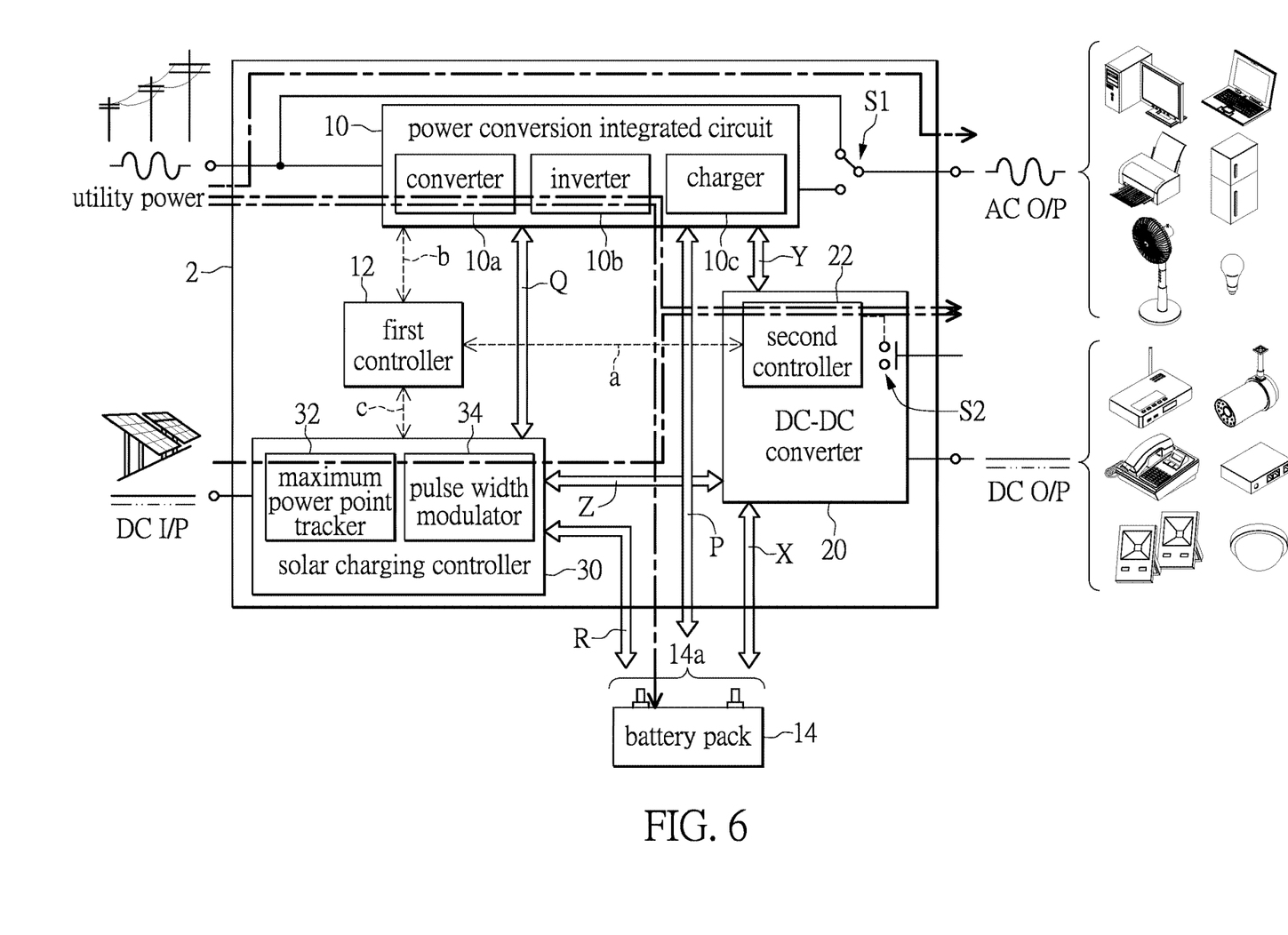
FIG. 6 is a schematic diagram of a power path of a utility power and solar energy providing power according to another embodiment of the present disclosure.

As shown in FIG. 6, when different power sources used all provide power normally, i.e., when the utility power normally provides AC power and the solar photovoltaic power normally provides DC power, the AC output power of the solar inverter 2 is directly provided by the utility power. That is, the first switch S1 is switched to the first terminal group, so that the AC power required by the AC power output terminal of the solar inverter 2 is provided. At the same time, the first controller 12, through the second control signal b, controls the converter 10*a* of the power conversion integrated circuit 10 to convert the utility AC power to the DC power that is transmitted to the DC-DC converter 20 through the second power path Y. Then, the first controller 12 controls the second controller 22 through the first control signal a, so that a DC output terminal of the DC-DC converter 20 outputs DC power output types as required by the user, such as outputting the DC output power of voltage values of 3V, 5V, 12V, 15V or 24V, thereby satisfying requirements of the user. Meanwhile, the second switch S2 is switched on, so that the DC power required by terminal DC appliances, such as network routers, digital telephones, digital speakers, digital products, webcams, network surveillance cameras and servers can be provided. As shown in FIG. 6, apart from controlling the converter 10*a* of the power conversion integrated circuit 10 through the second control signal b to convert the utility AC power to the DC power, the first controller 12 also controls the charger 10*c*, so that the charger 10*c* continuously charges the battery pack 14 by transmitting power through the connection of the third power path P.

It should be noted that, in FIG. 6, the first controller 12, through the aforementioned third control signal c, controls the solar charging controller 30 to modulate the DC input power (DC I/P) generated by the solar photovoltaic device to the DC power type that is required by the DC-DC converter 20. The first controller 12, through the first control signal a, further controls the second controller 22, so that the DC power is transmitted through the sixth power path Z, and the DC-DC converter 20 continuously outputs the DC power. At this time, the second switch S2 is switched on. Therefore, the DC output power can be stably provided to DC load appliances that require the DC output power.

Figure 7:
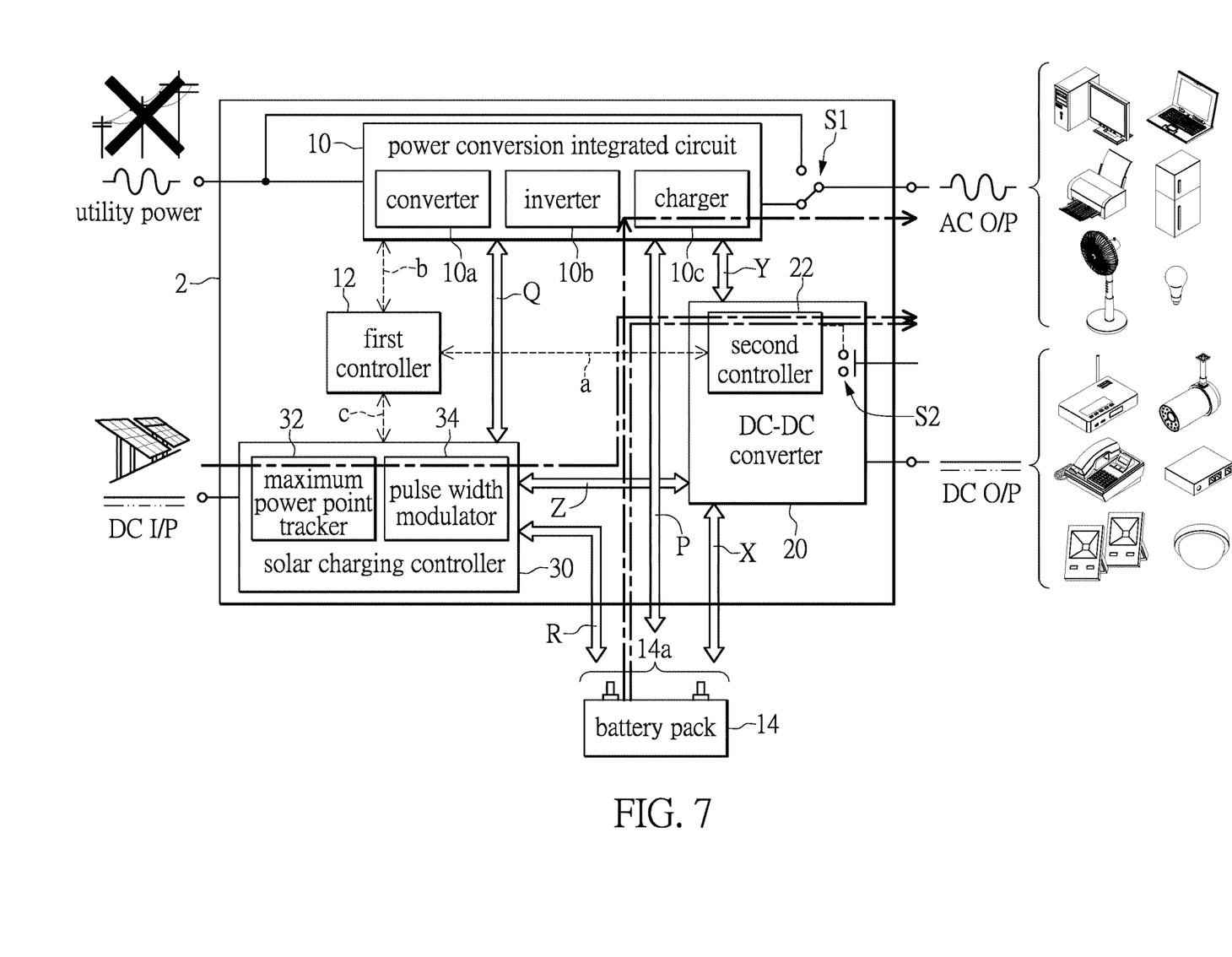
FIG. 7 is a schematic diagram of a power path of a battery pack and the solar energy providing power, without the utility power providing power, according to another embodiment of the present disclosure.

In FIG. 7, when the utility power fails and stops providing the AC power, the battery pack 14 and the DC input power provided by the solar photovoltaic device serve as a main power source of the solar inverter capable of intelligently controlling DC output 2 provided in the present disclosure. The second control signal b of the first controller 12 controls the inverter 10*b* of the power conversion integrated circuit 10 to invert the DC power provided by the battery pack 14 to the AC power. The DC power of the battery pack 14 is transmitted to the power conversion integrated circuit 10 through the third power path P, and is inverted to the AC power by the inverter 10*b* before being output to the AC power output terminal. At the same time, the first switch S1, through the control of the first controller 12, switches an output terminal to the aforementioned second terminal group (e.g., the terminal point at the lower left side of the first switch S1 of FIG. 1), so that the AC power is provided. In this way, the AC power output can be provided persistently and continuously for the use of home appliances that require the AC power. In FIG. 7, the first control signal a of the first controller 12 controls the second controller 22 of the DC-DC converter 20, so that the DC power of the battery pack 14 is transmitted to the DC-DC converter 20 through the first power path X. The second controller 22 further controls the DC power type that is output by the output terminal of the DC-DC converter 20, e.g., the second controller 22 controls DC voltage value of the DC output power to be 3V, 5V, 12V, 15V, or 24V. At this time, the second switch S2 is controlled to be switched on.

Figure 8:
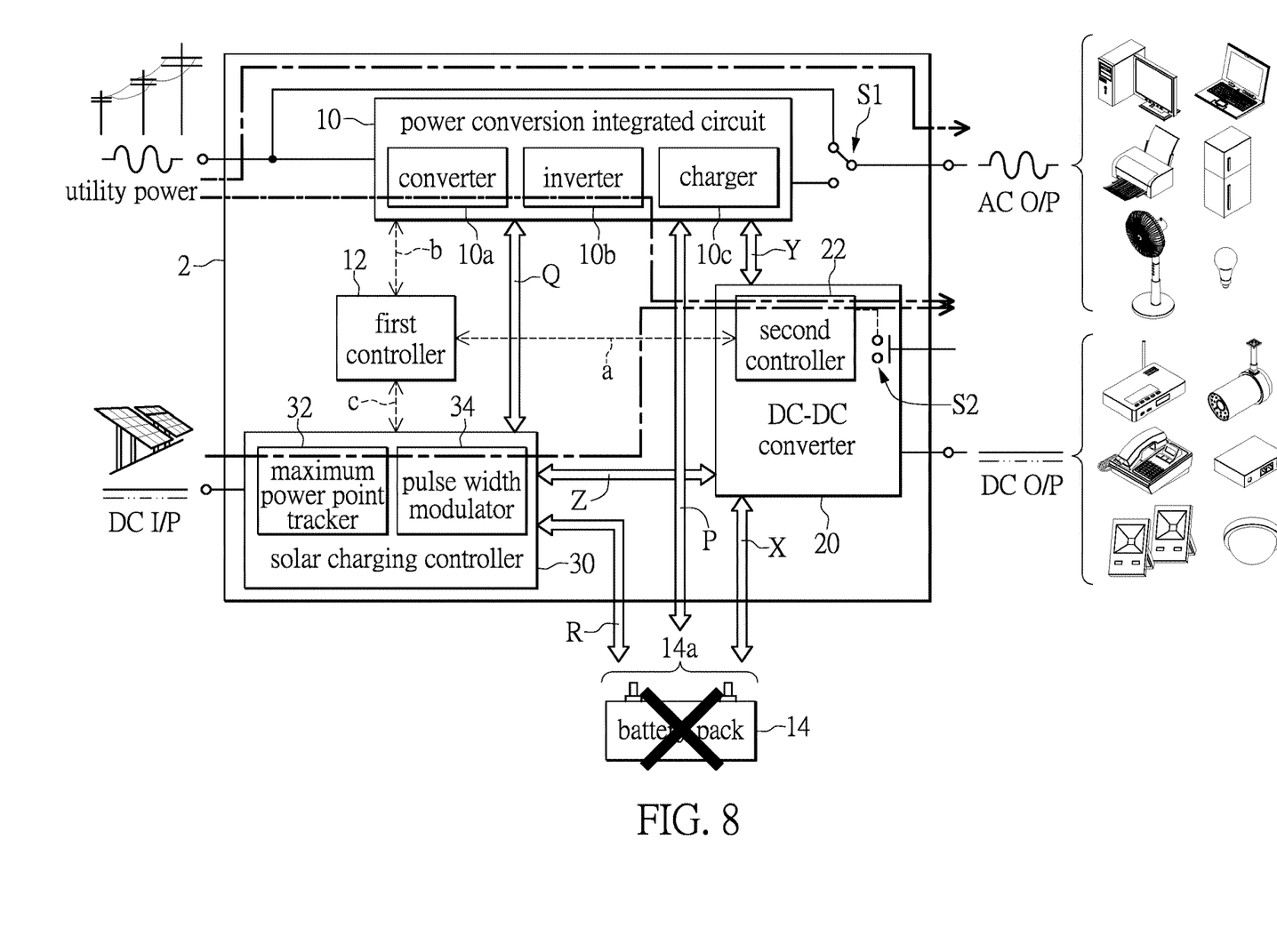
FIG. 8 is a schematic diagram of a power path of the utility power and the solar energy providing power, without the battery pack providing power, according to another embodiment of the present disclosure.

It should be noted that, in FIG. 7, the first controller 12, through the aforementioned third control signal c, controls the solar charging controller 30 to modulate the DC input power generated by the solar photovoltaic device to the DC power type that is required by the DC-DC converter 20. The first controller 12, through the first control signal a, further controls the second controller 22, so that the DC power is transmitted through the sixth power path Z, and the DC-DC converter 20 continuously outputs the DC power. At this time, the second switch S2 is switched on. Therefore, the DC output power can be stably provided to the DC load appliances that require the DC output power. As shown in FIG. 8, when the utility power and the solar photovoltaic device both normally provide power and the battery pack 14 fails to function, the main power sources of the solar inverter capable of intelligently controlling DC output 2 provided in the present disclosure are the AC power of the utility power and the DC power of the solar photovoltaic device. What is different from FIG. 6 is that, although the battery pack 14 fails to function, the second control signal b of the first controller 12 can still transfer the charging energy to the DC-DC converter 20 through the power conversion integrated circuit 10, so that the DC power is output to the DC power output terminal. Furthermore, in a completely battery-free system, the second control signal b of the present disclosure can still transfer the charging energy to the DC-DC converter 20 through the power conversion integrated circuit 10, so that the DC power is output to the DC power output terminal.

It should be noted that, in FIG. 8, the first controller 12, through the aforementioned third control signal c, controls the solar charging controller 30 to modulate the DC input power generated by the solar photovoltaic device to the DC power type that is required by the DC-DC converter 20. The first controller 12, through the first control signal a, further controls the second controller 22, so that the DC-DC converter 20 continuously outputs the DC power. At this time, the second switch S2 is switched on. Therefore, the DC output power can be stably provided to the DC load appliances that require the DC output power.

In the aforementioned embodiment that is shown in FIG. 6 to FIG. 8, the DC input power of the solar photovoltaic power is controlled to assist the DC power output terminal. Therefore, the fourth power path Q and the fifth power path R are not mentioned. However, in one embodiment where there is a solar photovoltaic device that has a high power DC output, such as a photovoltaic power station, the DC power of the solar photovoltaic device can be inverted by the power conversion integrated circuit 10 through the fourth power path Q, so that the AC power is continuously provided to the AC power output terminal. Alternatively, the DC power of the solar photovoltaic device may charge the battery pack 14 through the fifth power path R, or continuously perform charging for the battery pack 14 through the charging function of the power conversion integrated circuit 10. That is, when the energy or power of the solar photovoltaic device of the present disclosure is great enough to simultaneously provide the AC power output and charge the battery pack 14, in addition to providing the DC power required by the DC load appliances, the AC power output is also provided and a charging operation of the battery pack 14 is performed.

Figure 9:
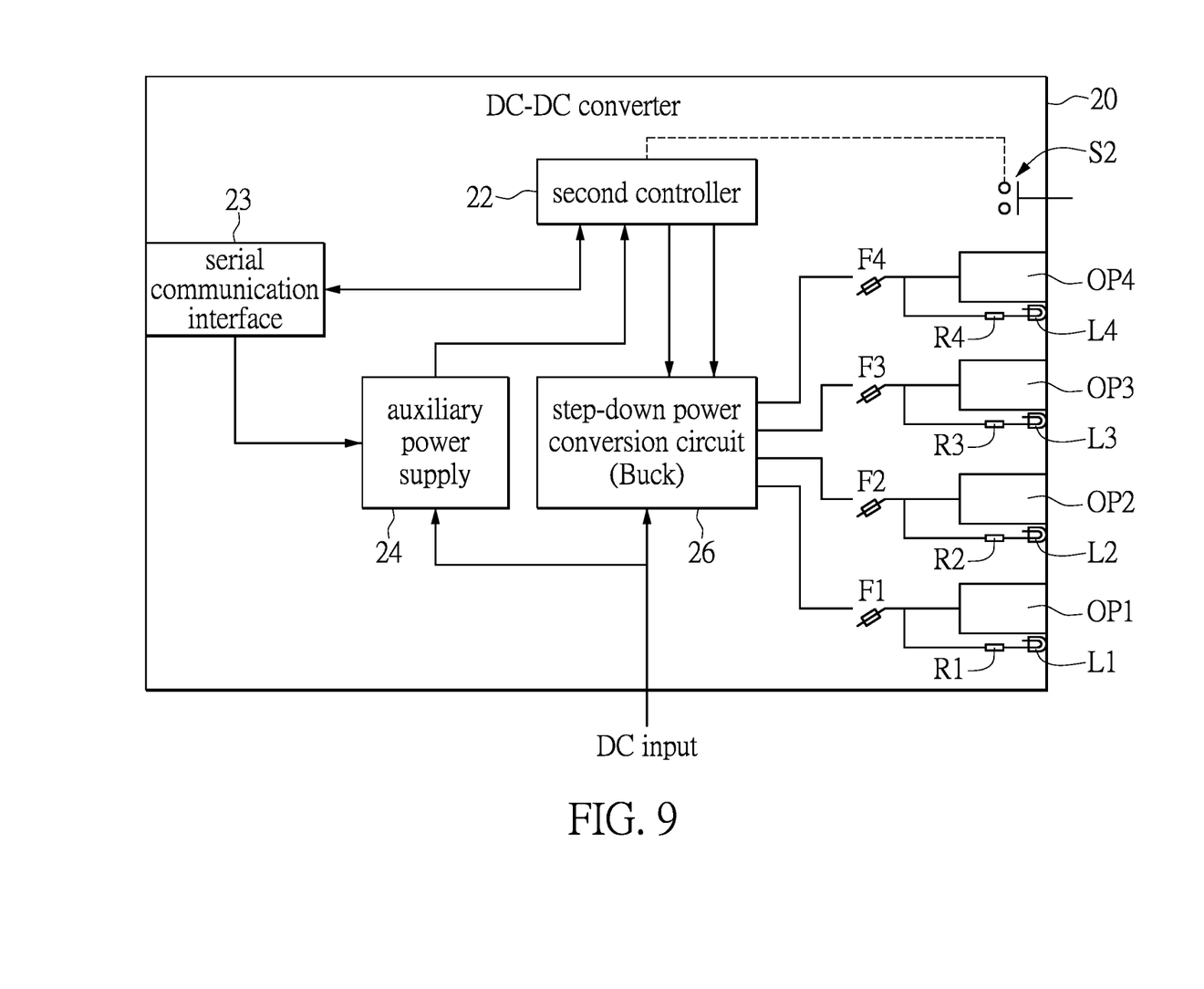
FIG. 9 is a schematic view of an internal circuit connection of a direct current (DC) to DC converter according to one embodiment of the present disclosure.

Reference is made to FIG. 9, which is a schematic view of an internal circuit connection of the DC-DC converter 20 of the present disclosure. The DC-DC converter 20 includes a step-down power conversion circuit 26, an auxiliary power supply 24, a serial communication interface 23, and at least two DC output interfaces OP1 and OP2. The step-down power conversion circuit 26 is connected to the second controller 22, an input terminal of the step-down power conversion circuit 26 is connected to the first power path X and the second power path Y, and further connected to the aforementioned sixth power path Z. That is, a position of a DC input as marked in FIG. 9 mainly receives a power transmission from the first power path X, the second power path Y and the sixth power path Z. Furthermore, output terminals of the step-down power conversion circuit 26 may be the output terminal of the DC-DC converter 20. The output terminals have a plurality of DC outputs, and the plurality of DC outputs are then connected to the power sockets of various DC output types. Practically, the step-down power conversion circuit 26 has the circuit topology of a buck converter, and is a step-down power converter, but the present disclosure is not limited thereto. The auxiliary power supply 24 is connected to the second controller 22. An input terminal of the auxiliary power supply 24 is connected to the input terminal of the step-down power conversion circuit 26, i.e., being connected to the DC input as shown in FIG. 9, and the DC input is connected to the first power path X and the second power path Y. The serial communication interface 23 is connected to the second controller 22 and the auxiliary power supply 24. In FIG. 9, four groups of DC output interfaces are shown, which are the first DC output interface OP1, the second DC output interface OP2, a third DC output interface OP3, and a fourth DC output interface OP4. In practice, there are at least two DC output interfaces (i.e., any two of the OP1 to OP4) in the present disclosure, and input terminals of the at least two DC output interfaces are connected to the output terminals of the step-down power conversion circuit 26. Furthermore, the aforementioned output terminal of the DC-DC converter 20 connecting to the DC power output terminal group of the uninterruptible power supply 1 or the solar inverter 2 is, in actuality, the output terminals of the step-down power conversion circuit 26 connecting to DC power output terminals of the first to fourth DC output interfaces OP1 to OP4.

Practically, the first to fourth DC output interfaces OP1 to OP4 can be DC sockets, or can be common adapters that are sockets having round socket holes and provide DC 12V, 15V or 5V power for various DC appliance electrical loads. In one embodiment, the first to fourth DC output interfaces OP1 to OP4 and the output terminals of the step-down power conversion circuit 26 are serially connected by first to fourth fuses F1 to F4, respectively, so that the DC-DC converter 20 can avoid overcurrent (i.e., overload). In another embodiment, the first to fourth DC output interfaces OP1 to OP4 are respectively connected in parallel to first to fourth LED lights L1 to L4, so as to indicate whether or not the first to fourth DC output interfaces OP1 to OP4 are outputting the DC power. Furthermore, the first to fourth LED lights L1 to L4 are respectively connected in series to first to fourth resistors R1 to R4, as shown in FIG. 9.

BENEFICIAL EFFECTS OF THE EMBODIMENTS

In conclusion, in the uninterruptible power supply capable of intelligently controlling direct current (DC) output provided by the present disclosure, different power supplies are provided according to different power sources (whether there being only the utility power, the utility power and the solar energy, or only the solar energy, or even when there being only the battery pack left for providing power), such that switching between power paths of different power supply states can be effectively controlled. Apart from continuously providing the AC power, the DC power required by the DC appliance electrical loads can still be stably and uninterruptedly provided. Therefore, for the DC appliance electrical loads requiring a continuous DC power supply (such as webcams or Wi-Fi wireless routers), the risks of losing video data, sudden network disconnection, or interruption of the operation of a digital phone that are caused by an interruption of DC power supply can be prevented. It is thus obvious that the technical contents of the present disclosure are strongly suitable for patent application.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An uninterruptible power supply capable of intelligently controlling direct current (DC) output, which is configured to have a utility power input terminal, an alternating current (AC) power output terminal, and a DC power output terminal group, the uninterruptible power supply comprising:
a power conversion integrated circuit, wherein an input terminal of the power conversion integrated circuit is connected to the utility power input terminal, and wherein the power conversion integrated circuit has an AC output terminal;
a first switch, wherein a first terminal group of the first switch is connected to the utility power input terminal, wherein a second terminal group of the first switch is connected to the AC output terminal of the power conversion integrated circuit, and wherein a third terminal group of the first switch is connected to the AC power output terminal;
a first controller generating a second control signal, wherein the second control signal is connected to the power conversion integrated circuit;
a DC to DC converter having a second power path, wherein the second power path is a path formed by an input terminal of the DC to DC converter connecting to the power conversion integrated circuit, and wherein an output terminal of the DC to DC converter is connected to the DC power output terminal group;
a second controller configured inside the DC to DC converter, wherein a terminal of the second controller is connected to a first control signal of the first controller, and another terminal of the second controller is connected to a second switch; and
a battery pack, wherein the battery pack and the DC to DC converter are connected to form a first power path, and the battery pack and the power conversion integrated circuit are connected to form a third power path.

2. The uninterruptible power supply according to claim 1, wherein the DC to DC converter includes:
a step-down power conversion circuit connected to the second controller, wherein an input terminal of the step-down power conversion circuit is connected to the first power path and the second power path, and wherein an output terminal of the step-down power conversion circuit is the output terminal of the DC to DC converter; and
an auxiliary power supply connected to the second controller, wherein an input terminal of the auxiliary power supply is connected to the first power path and the second power path.

3. The uninterruptible power supply according to claim 1, wherein the DC to DC converter further includes:
a serial communication interface connected to the second controller, and connected to the auxiliary power supply.

4. The uninterruptible power supply according to claim 2, wherein the output terminal of the DC to DC converter includes:
at least two DC output interfaces having input terminals that are connected to the output terminal of the step-down power conversion circuit;
wherein the output terminal of the DC to DC converter is connected to the DC power output terminal group, and the output terminal of the step-down power conversion circuit is connected to DC power output terminals of the at least two DC output interfaces.

5. An uninterruptible power supply capable of intelligently controlling DC output adopting the uninterruptible power supply as claimed in claim 1, being configured to have a utility power input terminal, an AC power output terminal, and a DC power output terminal group, and further having a DC power input terminal connected to a DC power source generated by a solar photovoltaic board, wherein a battery pack is configured to be an external battery pack, the uninterruptible power supply comprising:
a power conversion integrated circuit, wherein an input terminal of the power conversion integrated circuit is connected to the utility power input terminal, and wherein the power conversion integrated circuit has an AC output terminal;
a first switch, wherein a first terminal group of the first switch is connected to the utility power input terminal, wherein a second terminal group of the first switch is connected to the AC output terminal of the power conversion integrated circuit, and wherein a third terminal group of the first switch is connected to the AC power output terminal;
a first controller generating a second control signal, wherein the second control signal is connected to the power conversion integrated circuit;
a DC to DC converter having a second power path, wherein the second power path is a path formed by an input terminal of the DC to DC converter connecting to the power conversion integrated circuit, and wherein an output terminal of the DC to DC converter is connected to the DC power output terminal group;
a second controller configured inside the DC to DC converter, wherein a terminal of the second controller is connected to a first control signal of the first controller, and another terminal of the second controller is connected to a second switch;
a battery pack connection terminal, wherein the battery pack connection terminal and the DC to DC converter are connected to form a first power path, and the battery pack connection terminal and the power conversion integrated circuit are connected to form a third power path; and
a solar charging controller connected to the first controller, the power conversion integrated circuit, the DC to DC converter and the battery pack connection terminal, wherein the solar charging controller is connected to the first controller through a third control signal.

6. The uninterruptible power supply according to claim 5, wherein the solar charging controller includes:
a maximum power point tracker configured to perform tracking of a maximum power point of a solar photovoltaic power in the solar charging controller; and
a pulse-width modulation controller configured to perform pulse-width modulation for a power switching control circuit of the solar charging controller;
wherein the solar charging controller and the power conversion integrated circuit are connected to form a fourth power path, the solar charging controller and the DC to DC converter are connected to form a sixth power path, and the solar charging controller and the battery pack connection terminal are connected to form a fifth power path.

7. The uninterruptible power supply according to claim 5, wherein the DC to DC converter includes:
- a step-down power conversion circuit connected to the second controller, wherein an input terminal of the step-down power conversion circuit is connected to the first power path and the second power path, and wherein an output terminal of the step-down power conversion circuit is the output terminal of the DC to DC converter;
- an auxiliary power supply connected to the second controller, wherein an input terminal of the auxiliary power supply is connected to the first power path and the second power path; and
- a serial communication interface connected to the second controller, and connected to the auxiliary power supply.

8. The uninterruptible power supply according to claim 7, wherein the output terminal of the DC to DC converter includes:
- at least two DC output interfaces having input terminals that are connected to the output terminal of the step-down power conversion circuit;
- wherein the output terminal of the DC to DC converter is connected to the DC power output terminal group, and the output terminal of the step-down power conversion circuit is connected to DC power output terminals of the at least two DC output interfaces.

\* \* \* \* \*